US008073689B2

(12) United States Patent
Hetherington et al.

(10) Patent No.: US 8,073,689 B2
(45) Date of Patent: Dec. 6, 2011

(54) REPETITIVE TRANSIENT NOISE REMOVAL

(75) Inventors: Phillip A. Hetherington, Port Moody (CA); Shreyas A. Paranjpe, Vancouver (CA)

(73) Assignee: QNX Software Systems Co., Ottawa, Ontario (CA)

( * ) Notice: Subject to any disclaimer, the term of this patent is extended or adjusted under 35 U.S.C. 154(b) by 776 days.

(21) Appl. No.: 11/331,806

(22) Filed: Jan. 13, 2006

(65) Prior Publication Data

US 2006/0116873 A1 Jun. 1, 2006

Related U.S. Application Data

(63) Continuation-in-part of application No. 11/252,160, filed on Oct. 17, 2005, which is a continuation-in-part of application No. 11/006,935, filed on Dec. 8, 2004, which is a continuation-in-part of application No. 10/688,802, filed on Oct. 16, 2003, which is a continuation-in-part of application No. 10/410,736, filed on Apr. 10, 2003.

(60) Provisional application No. 60/449,511, filed on Feb. 21, 2003.

(51) Int. Cl.
*G10L 15/20* (2006.01)
*G10L 21/02* (2006.01)

(52) U.S. Cl. ......... 704/233; 704/205; 704/211; 704/226

(58) Field of Classification Search .................. 704/226, 704/233

See application file for complete search history.

(56) References Cited

U.S. PATENT DOCUMENTS

| | | | | | |
|---|---|---|---|---|---|
| 4,486,900 | A | | 12/1984 | Cox et al. | |
| 4,531,228 | A | | 7/1985 | Noso et al. | |
| 4,630,304 | A | * | 12/1986 | Borth et al. | 381/94.3 |
| 4,630,305 | A | | 12/1986 | Borth et al. | |
| 4,811,404 | A | | 3/1989 | Vilmur et al. | |
| 4,843,562 | A | | 6/1989 | Kenyon et al. | |
| 4,845,466 | A | * | 7/1989 | Hariton et al. | 375/257 |
| 5,012,519 | A | * | 4/1991 | Adlersberg et al. | 704/226 |

(Continued)

FOREIGN PATENT DOCUMENTS

CA 2158847 9/1994

(Continued)

OTHER PUBLICATIONS

Vaseghi, "Advanced Digital Signal Processing and Noise Reduction", Publisher, John Wiley & Sons Ltd, 2000.*

(Continued)

*Primary Examiner* — James S. Wozniak
*Assistant Examiner* — Jialong He
(74) *Attorney, Agent, or Firm* — Brinks Hofer Gilson & Lione

(57) ABSTRACT

A system improves the perceptual quality of a speech signal by dampening undesired repetitive transient noises. The system includes a repetitive transient noise detector adapted to detect repetitive transient noise in a received signal. The received signal may include a harmonic and a noise spectrum. The system further includes a repetitive transient noise attenuator that substantially removes or dampens repetitive transient noises from the received signal. The method of dampening the repetitive transient noises includes modeling characteristics of repetitive transient noises; detecting characteristics in the received signal that correspond to the modeled characteristics of the repetitive transient noises; and substantially removing components of the repetitive transient noises from the received signal that correspond to some or all of the modeled characteristics of the repetitive transient noises.

34 Claims, 12 Drawing Sheets

U.S. PATENT DOCUMENTS 5,027,410 A 6/1991 Williamson et al.
5,056,150 A 10/1991 Yu et al.
5,146,539 A 9/1992 Doddington et al.
5,251,263 A 10/1993 Andrea et al.
5,313,555 A 5/1994 Kamiya
5,400,409 A 3/1995 Linhard
5,426,703 A * 6/1995 Hamabe et al. ............ 381/71.12
5,426,704 A 6/1995 Tamamura et al.
5,442,712 A 8/1995 Kawamura et al.
5,479,517 A 12/1995 Linhard
5,485,522 A 1/1996 Solve et al.
5,495,415 A 2/1996 Ribbens et al.
5,499,189 A * 3/1996 Seitz ............................ 700/286
5,502,688 A 3/1996 Recchione et al.
5,526,466 A 6/1996 Takizawa
5,550,924 A 8/1996 Helf et al.
5,568,559 A 10/1996 Makino
5,584,295 A 12/1996 Muller et al.
5,586,028 A 12/1996 Sekine et al.
5,617,508 A 4/1997 Reaves
5,651,071 A 7/1997 Lindemann et al.
5,677,987 A 10/1997 Seki et al.
5,680,508 A 10/1997 Liu
5,692,104 A 11/1997 Chow et al.
5,701,344 A 12/1997 Wakui
5,727,072 A 3/1998 Raman
5,752,226 A 5/1998 Chan et al.
5,757,937 A 5/1998 Itoh et al.
5,809,152 A 9/1998 Nakamura et al.
5,839,101 A * 11/1998 Vahatalo et al. .............. 704/226
5,859,420 A 1/1999 Borza
5,878,389 A 3/1999 Hermansky et al.
5,920,834 A 7/1999 Sih et al.
5,933,495 A 8/1999 Oh
5,933,801 A 8/1999 Fink et al.
5,949,888 A 9/1999 Gupta et al.
5,950,154 A * 9/1999 Medaugh et al. ............. 704/226
5,982,901 A 11/1999 Kane et al.
6,011,853 A 1/2000 Koski et al.
6,108,610 A * 8/2000 Winn ............................. 702/77
6,122,384 A 9/2000 Mauro
6,130,949 A 10/2000 Aoki et al.
6,163,608 A 12/2000 Romesburg et al.
6,167,375 A 12/2000 Miseki et al.
6,173,074 B1 1/2001 Russo
6,175,602 B1 * 1/2001 Gustafsson et al. .......... 375/346
6,192,134 B1 2/2001 White et al.
6,199,035 B1 3/2001 Lakaniemi et al.
6,208,268 B1 3/2001 Scarzello et al.
6,230,123 B1 * 5/2001 Mekuria et al. ............... 704/226
6,252,969 B1 6/2001 Ando
6,289,309 B1 9/2001 deVries
6,405,168 B1 6/2002 Bayya et al.
6,415,253 B1 7/2002 Johnson
6,434,246 B1 8/2002 Kates et al.
6,453,285 B1 9/2002 Anderson et al.
6,507,814 B1 1/2003 Gao
6,510,408 B1 * 1/2003 Hermansen ................... 704/233
6,587,816 B1 7/2003 Chazan et al.
6,615,170 B1 9/2003 Liu et al.
6,643,619 B1 11/2003 Linhard et al.
6,647,365 B1 11/2003 Faller
6,687,669 B1 2/2004 Schrögmeier et al.
6,711,536 B2 3/2004 Rees
6,741,873 B1 5/2004 Doran et al.
6,766,292 B1 7/2004 Chandran et al.
6,768,979 B1 * 7/2004 Menendez-Pidal et al. .. 704/226
6,782,363 B2 8/2004 Lee et al.
6,822,507 B2 11/2004 Buchele
6,859,420 B1 2/2005 Coney et al.
6,882,736 B2 4/2005 Dickel et al.
6,910,011 B1 6/2005 Zakarauskas
6,937,980 B2 8/2005 Krasny et al.
6,959,276 B2 10/2005 Droppo et al.
7,043,030 B1 5/2006 Furuta
7,047,047 B2 5/2006 Acero et al.
7,062,049 B1 * 6/2006 Inoue et al. .................. 381/71.4
7,072,831 B1 7/2006 Etter
7,092,877 B2 8/2006 Ribic
7,117,145 B1 10/2006 Venkatesh et al.
7,117,149 B1 10/2006 Zakarauskas
7,158,932 B1 1/2007 Furuta
7,165,027 B2 1/2007 Kellner et al.
7,313,518 B2 12/2007 Scalart et al.
7,373,296 B2 5/2008 Van Der Par et al.
7,386,217 B2 6/2008 Zhang
2001/0028713 A1 10/2001 Walker
2002/0037088 A1 3/2002 Dickel et al.
2002/0071573 A1 6/2002 Finn
2002/0094100 A1 7/2002 Kates et al.
2002/0094101 A1 7/2002 De Roo et al.
2002/0176589 A1 11/2002 Buck et al.
2003/0040908 A1 * 2/2003 Yang et al. .................... 704/233
2003/0147538 A1 8/2003 Elko
2003/0151454 A1 8/2003 Buchele
2003/0216907 A1 11/2003 Thomas
2004/0078200 A1 4/2004 Alves
2004/0093181 A1 5/2004 Lee
2004/0138882 A1 7/2004 Miyazawa
2004/0161120 A1 8/2004 Petersen et al.
2004/0165736 A1 8/2004 Hetherington et al.
2004/0167777 A1 * 8/2004 Hetherington et al. ....... 704/226
2005/0114128 A1 5/2005 Hetherington et al.
2005/0238283 A1 10/2005 Faure et al.
2005/0240401 A1 10/2005 Ebenezer
2006/0034447 A1 2/2006 Alves et al.
2006/0074646 A1 4/2006 Alves et al.
2006/0100868 A1 5/2006 Hetherington et al.
2006/0115095 A1 6/2006 Glesbrecht et al.
2006/0136199 A1 6/2006 Nongpiur et al.
2006/0251268 A1 11/2006 Hetherington et al.
2006/0287859 A1 12/2006 Hetherington et al.
2007/0019835 A1 1/2007 Ivo de Roo et al.
2007/0033031 A1 2/2007 Zakarauskas

FOREIGN PATENT DOCUMENTS

CA 2157496 10/1994
CA 2158064 10/1994
CN 1325222 A 12/2001
EP 0 076 687 A1 4/1983
EP 0 629 996 A2 12/1994
EP 0 629 996 A3 12/1994
EP 0 750 291 A1 12/1996
EP 1 450 353 A1 8/2004
EP 1 450 354 A1 8/2004
EP 1 669 983 A1 6/2006
JP 64-039195 2/1989
JP 06269084 9/1994
JP 6 282 297 10/1994
JP 06-319193 11/1994
JP 06319193 11/1994
JP 6 349 208 12/1994
JP 2001-215992 8/2001
WO WO 00-41169 A1 7/2000
WO WO 0156255 A1 8/2001
WO WO 01-73761 A1 10/2001

OTHER PUBLICATIONS

Boll, "Suppression of Acoustic Noise in Speech Using Spectral Substraction", IEEE Trans. on Acoustics, Speech, and Signal Processing, Apr. 1979.*

European Search Report for Application No. 04003675.8-2218, dated May 12, 2004.

Puder, H. et al., "Improved Noise Reduction for Hands-Free Car Phones Utilizing Information on Vehicle and Engine Speeds", Sep. 4-8, 2000, pp. 1851-1854, vol. 3, XP009030255, 2000, Tampere, Finland, Tampere Univ. Technology, Finland Abstract.

Shust, Michael R. and Rogers, James C., Abstract of "Active Removal of Wind Noise From Outdoor Microphones Using Local Velocity Measurements", *J. Acoust. Soc. Am.*, vol. 104, No. 3, Pt 2, 1998, 1 page.

Shust, Michael R. and Rogers, James C., "Electronic Removal of Outdoor Microphone Wind Noise", obtained from the Internet on Oct. 5, 2006 at: <http://www.acoustics.org/press/136th/mshust.htm>, 6 pages.

Wahab A. et al., "Intelligent Dashboard With Speech Enhancement", Information, Communications and Signal Processing, 1997. ICICS, Proceedings of 1997 International Conference on Singapore, Sep. 9-12, 1997, New York, NY, USA, IEEE, pp. 993-997.
Avendano, C., Hermansky, H., "Study on the Dereverberation of Speech Based on Temporal Envelope Filtering," Proc. ICSLP '96, pp. 889-892, Oct. 1996.
Fiori, S., Uncini, A., and Piazza, F., "Blind Deconvolution by Modified Bussgang Algorithm", Dept. of Electronics and Automatics—University of Ancona (Italy), ISCAS 1999.
Learned, R.E. et al., A Wavelet Packet Approach to Transient Signal Classification, Applied and Computational Harmonic Analysis, Jul. 1995, pp. 265-278, vol. 2, No. 3, USA, XP 000972660. ISSN: 1063-5203. abstract.
Nakatani, T., Miyoshi, M., and Kinoshita, K., "Implementation and Effects of Single Channel Dereverberation Based on the Harmonic Structure of Speech," Proc. of IWAENC-2003, pp. 91-94, Sep. 2003.
Quatieri, T.F. et al., Noise Reduction Using a Soft-Dection/Decision Sine-Wave Vector Quantizer, International Conference on Acoustics, Speech & Signal Processing, Apr. 3, 1990, pp. 821-824, vol. Conf. 15, IEEE ICASSP, New York, US XP000146895, Abstract, Paragraph 3.1.
Quelavoine, R. et al., Transients Recognition in Underwater Acoustic with Multilayer Neural Networks, Engineering Benefits from Neural Networks, Proceedings of the International Conference EANN 1998, Gibraltar, Jun. 10-12, 1998 pp. 330-333, XP 000974500. 1998, Turku, Finland, Syst. Eng. Assoc., Finland. ISBN: 951-97868-0-5. abstract, p. 30 paragraph 1.
Simon, G., Detection of Harmonic Burst Signals, International Journal Circuit Theory and Applications, Jul. 1985, vol. 13, No. 3, pp. 195-201, UK, XP 000974305. ISSN: 0098-9886. abstract.
Vieira, J., "Automatic Estimation of Reverberation Time", Audio Engineering Society, Convention Paper 6107, 116th Convention, May 8-11, 2004, Berlin, Germany, pp. 1-7.
Zakarauskas, P., Detection and Localization of Nondeterministic Transients in Time series and Application to Ice-Cracking Sound, Digital Signal Processing, 1993, vol. 3, No. 1, pp. 36-45, Academic Press, Orlando, FL, USA, XP 000361270, ISSN: 1051-2004. entire document.
Berk et al., "Data Analysis with Microsoft Excel", Duxbury Press, 1998, pp. 236-239 and 256-259.
Seely, S., "An Introduction to Engineering Systems", Pergamon Press Inc., 1972, pp. 7-10.
Vaseghi, S., "Advanced Digital Signal Processing and Noise Reduction," Publisher, John Wiley & Sons Ltd., 2000, Chapter 12, pp. 354-377.
Ephraim, Y., "Statistical-Model-Based Speech Enhancement Systems," *IEEE*, vol. 80, No. 10, 1992, pp. 1526-1555.
Godsill, S. et al., "Digital Audio Restoration," Department of Engineering, University of Cambridge, 1997, pp. 1-71.
Ljung, L., Chapter 1, "Introduction," *System Identification Theory for the User*, 2nd ed., Prentice Hall, Upper Saddle River, New Jersey, Copyright 1999, pp. 1-14.
Pellom, B. et al., "An Improved (Auto:I, LSP:T) Constrained Iterative Speech Enhancement for Colored Noise Environments," *IEEE Trans. On Speech and Audio Processing*, vol. 6, No. 6, 1998, pp. 573-579.
Udrea, R. M. et al., "Speech Enhancement Using Spectral Over-Subtraction and Residual Noise Reduction," IEEE, 2003, pp. 165-168.
Pellom, B.; Hansen, J., An Improved (Auto:I,LSP:T) Constrained Iterative Speech Enhancement for Colored Noise Environments, Speech and Audio Processing, IEEE Transactions on vol. 6, Issue 6, Nov. 1998, pp. 573-579.

* cited by examiner

REPETITIVE TRANSIENT NOISE REMOVAL

PRIORITY CLAIM

This application is a continuation-in-part of U.S. application Ser. No. 11/252,160 "Minimization of Transient Noises in a Voice Signal," filed Oct. 17, 2005, which is a continuation-in-part of U.S. application Ser. No. 11/006,935 "System for Suppressing Rain Noise," filed Dec. 8, 2004, which is a continuation-in-part of U.S. application Ser. No. 10/688,802 "System for Suppressing Wind Noise," filed Oct. 16, 2003, which is a continuation-in-part of U.S. application Ser. No. 10/410,736, "Method and Apparatus for Suppressing Wind Noise," filed Apr. 10, 2003, which claims priority to U.S. Application No. 60/449,511, "Method for Suppressing Wind Noise" filed on Feb. 21, 2003, each of which are incorporated herein by reference.

BACKGROUND OF THE INVENTION

1. Technical Field

This invention relates to acoustics, and more particularly, to a system that enhances the quality of a conveyed voice signal.

2. Related Art

Communication devices may acquire, assimilate, and transfer voice signals. In some systems, the clarity of the voice signals depends on the quality of the communication system, communication medium, and the accompanying noise. When noise occurs near a source or a receiver, distortion may garble the signals and destroy information. In some instances, the noise masks the signals making them unrecognizable to a listener or a voice recognition system.

Noise originates from many sources. In a vehicle noise may be created by an engine or a movement of air or by tires moving across a road. Some noises are characterized by their short duration and repetition. The spectral shapes of these noises may be characterized by a gradual rise in signal intensity between a low and a mid frequency followed by a peak and a gradual tapering off at a higher frequency that is then repeated. Other repetitive transient noises have different spectral shapes. Although repetitive transient noises may have differing spectral shapes, each of these repetitive transient noises may mask speech. Therefore, there is a need for a system that detects and dampens repetitive transient noises.

SUMMARY

A system improves the perceptual quality of a speech signal by dampening undesired repetitive transient noises. The system comprises a repetitive transient noise detector adapted to detect repetitive transient noise in a received signal that comprises a harmonic and a noise spectrum. A repetitive transient noise attenuator substantially removes or dampens repetitive transient noises from the received signal.

A method of dampening the repetitive transient noises comprises modeling characteristics of repetitive transient noises; detecting characteristics in a signal that correspond to the modeled characteristics of the repetitive transient noises; and substantially removing components of the repetitive transient noises from the signal that correspond to some or all of the modeled characteristics of the repetitive transient noises.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A voice enhancement system improves the perceptual quality of a voice signal. The system analyzes aural signals to detect repetitive transient noises within a device or structure for transporting persons or things (e.g., a vehicle). These noises may occur naturally (e.g., wind passing across a surface) or may be man made (e.g., clicking sound of a turn signal, the swishing sounds of windshield wipers, etc.). When detected, the system substantially eliminates or dampens the repetitive transient noises. Repetitive transient noises may be attenuated in real-time, near real-time, or after a delay, such as a buffering delay (e.g., of about 300-500 ms). Some systems also dampen or substantially remove continuous noises, such as background noise, and/or noncontinuous noises that may be of short duration and of relatively high amplitude (e.g., such as an impulse noise). Some systems may also eliminate the "musical noise," squeaks, squawks, clicks, drips, pops, tones, and other sound artifacts generated by some voice enhancement systems.

Figure 1:
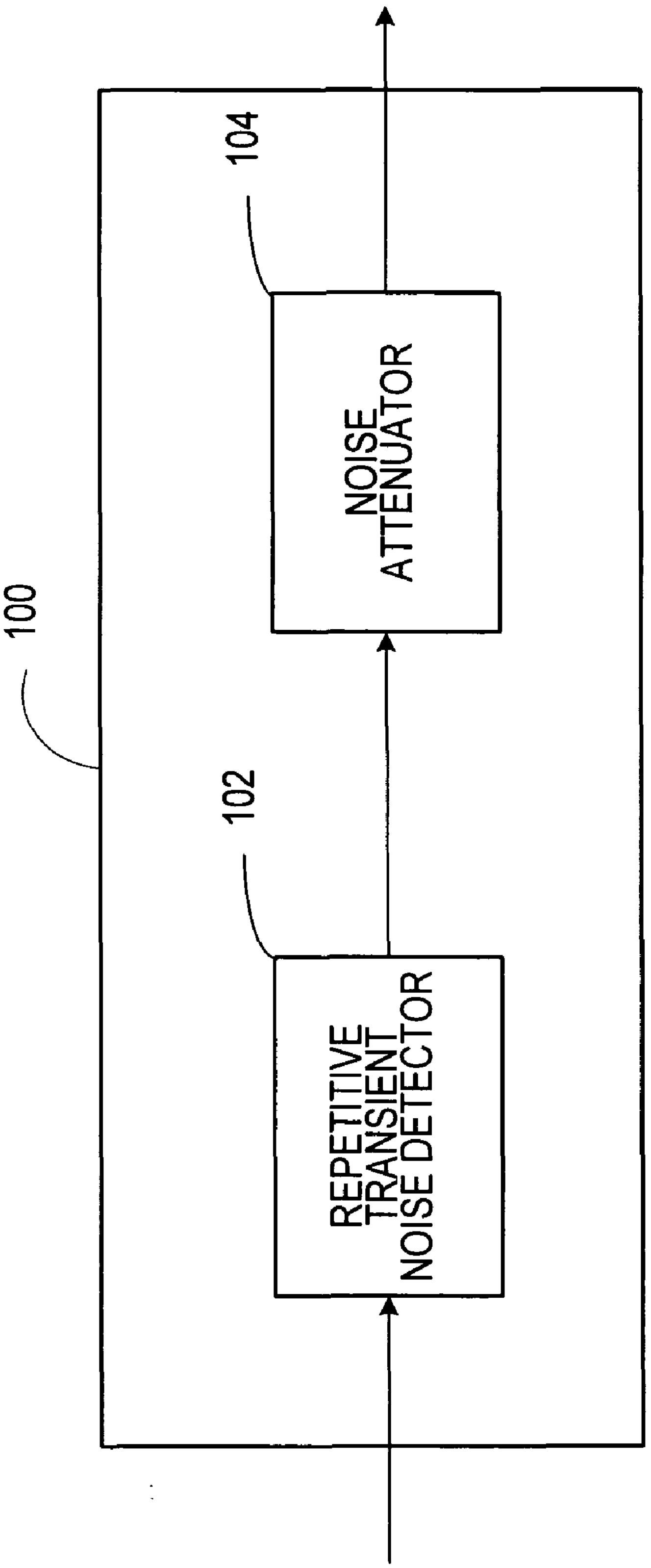
FIG. 1 is a partial block diagram of a voice enhancement system.

FIG. 1 is a partial block diagram of a voice enhancement system 100. The voice enhancement system 100 may encompass dedicated hardware and/or software that may be executed by one or more processors that run on one or more operating systems. The voice enhancement system 100 includes a repetitive transient noise detector 102 and a noise attenuator 104. In FIG. 1, an aural signal is analyzed to determine whether the signal includes a repetitive transient noise. When identified, the repetitive transient noise may be removed.

Some repetitive transient noises have temporal and frequency characteristics that may be analyzed or modeled.

Some repetitive transient noise detectors 102 detect these noises by identifying attributes that are common to repetitive transient noises or by comparing the aural signals to modeled repetitive transient noises. When repetitive transient noises are detected, a noise attenuator 104 substantially removes or dampens the repetitive transient noises.

In FIG. 1, the noise attenuator 104 may comprise a neural network mapping of repetitive transient noises; a system that subtracts repetitive transient noise from the received signal; a system that selects a noise-reduced signal from one or more code books based on an estimated or measured repetitive transient noise; and/or a system that generate a noise-reduced signal by other systems or processes. In some systems, the noise attenuator 104 may attenuate continuous or noncontinuous noise that may be a part of the short term spectra of the received signal. Some noise attenuators 104 also interface or include a residual attenuator (not shown) that removes sound artifacts such as the "musical noise", squeaks, squawks, chirps, clicks, drips, pops, tones or others that may result from the attenuation or removal of the repetitive transient noise.

The repetitive transient noise detector 102 may separate the noise-like segments from the remaining signal in real-time, near real-time, or after a delay. The repetitive transient noise detector 102 may separate the periodic or near periodic (e.g., quasi-periodic) noise segments regardless of the amplitude or complexity of the received signal. When some repetitive transient noise detectors 102 detect a repetitive transient noise, the repetitive transient noise detectors 102 model the temporal and spectral characteristics of the detected repetitive transient noise. The repetitive transient noise detector 102 may retain the entire model of the repetitive transient noise, or may store selected attributes in an internal or remote memory. A plurality of repetitive transient noise models may create an average repetitive transient noise model, or a plurality of attributes may be combined to detect and/or remove the repetitive transient noise.

Figure 2:
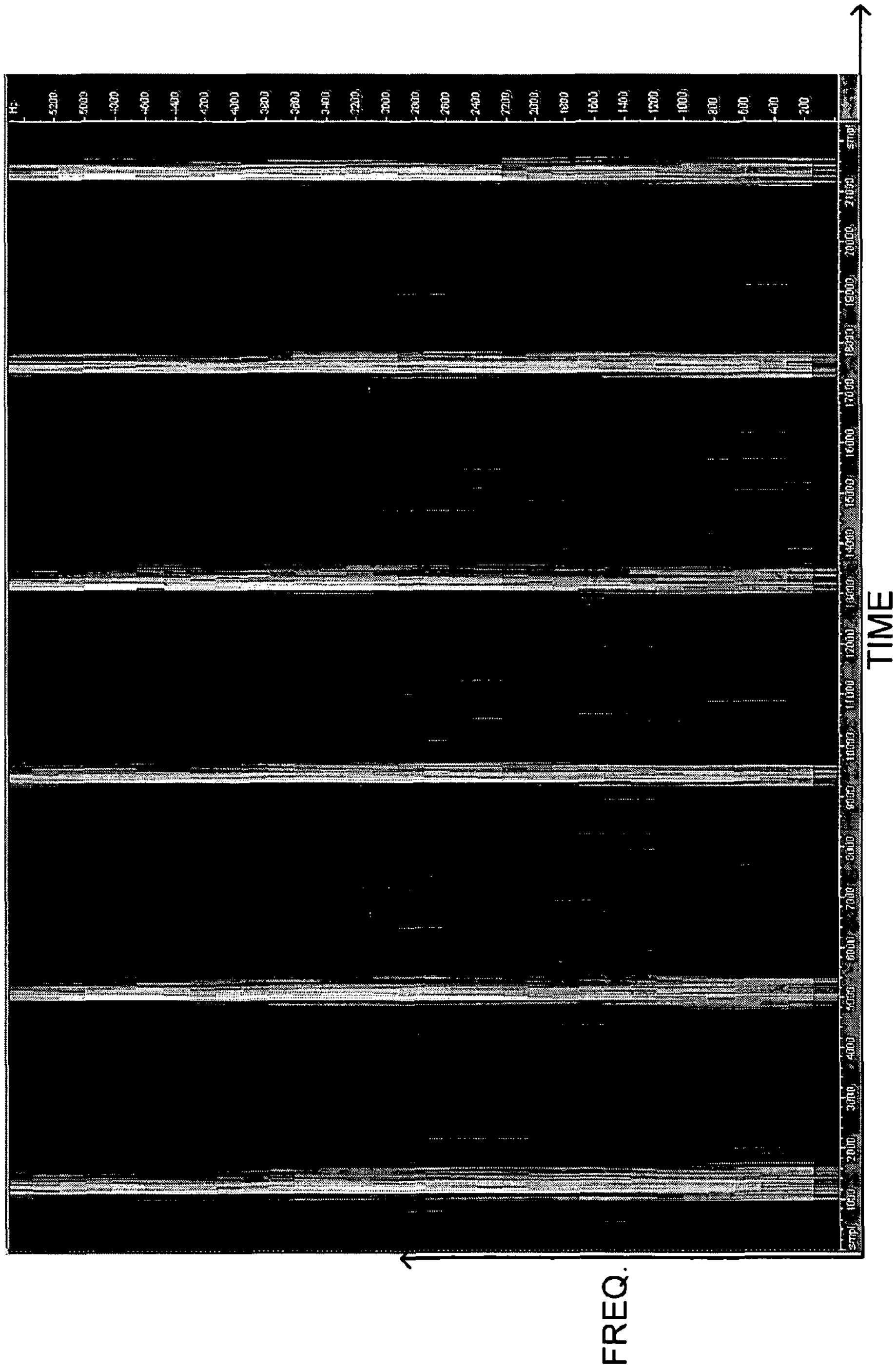
FIG. 2 is a spectrogram of representative repetitive transient noises.

FIG. 2 is a spectrogram of representative repetitive transient noises. Six transients are shown substantially equally spaced in time. The transients share a substantially similar spectral shape that repeat at a nearly periodic rate. While many transients may occur for a short period of time, such as when a device automatically switches a device off and on such as a lamp or wipers in a vehicle, other representative repetitive transients that may be dampened or substantially removed may occur regularly and frequently and may have many other and different spectral shapes.

Figure 3:
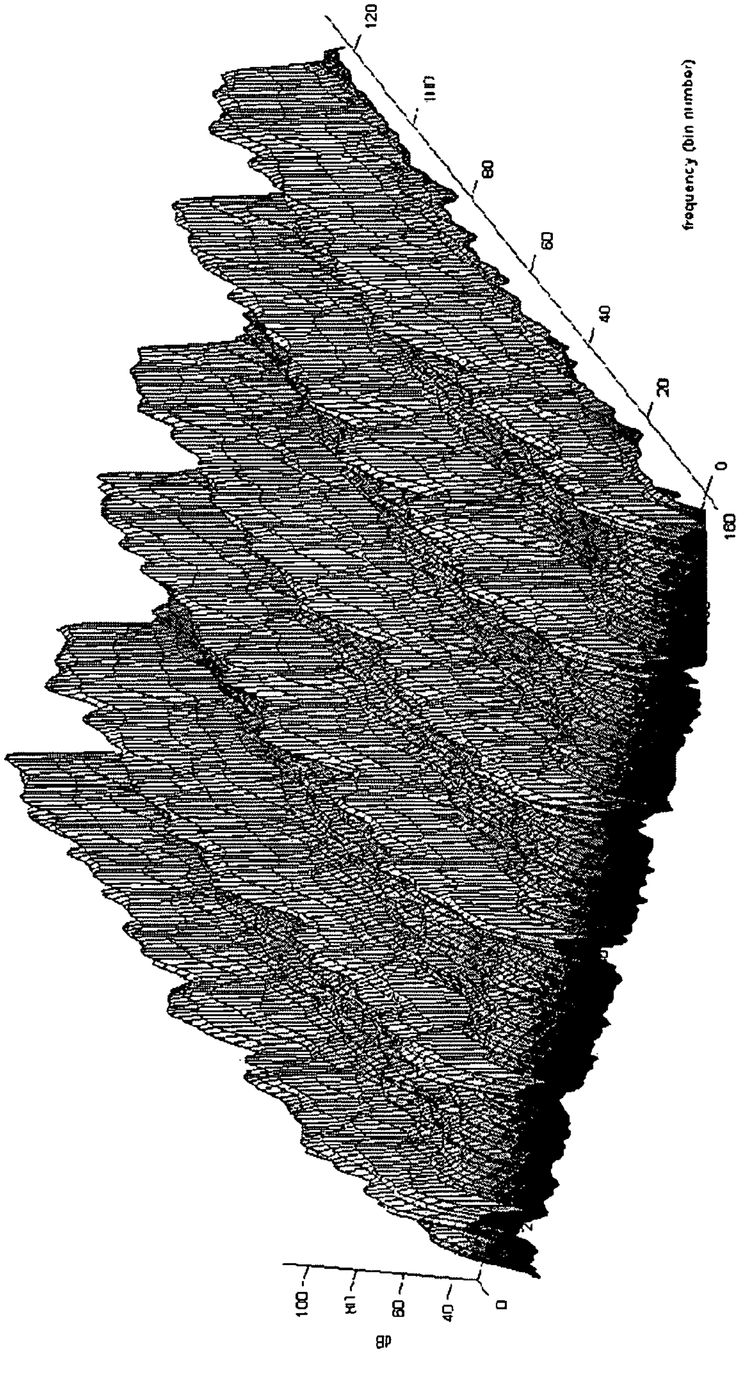
FIG. 3 is a plot of the repetitive transient noises of FIG. 2.

FIG. 3 is a plot of the representative repetitive transient noise of FIG. 2. In this three dimensional plot, the horizontal axis represents time or a frame number, the vertical axis represent decibels and the axis extending from the front to the back represents frequency. The repetitive transient noise is measured across about a 5.5 kHz range. In time the repetitive transient noise are substantially equally spaced apart. In frequency, the repetitive transient noise extends across a broadband, gradually increasing in amplitude at the low and mid frequency range before gradual tapering off at higher frequencies. While some repetitive transient noises may be nearly identical, others are not as shown in the spectral structure of the signals in FIG. 2.

Some repetitive transient noise detectors 102 identify noise events that are likely to be repetitive transient noises based on their temporal and spectral structures. Using a weighted average, leaky integrator, or some other adaptive modeling technique, the repetitive transient noise detector 102 may estimate or measures the temporal spacing of repetitive transient noises. The frequency response may also be estimated or measured. In FIG. 2, the repetitive transient noise is characterized by a gradual rise in signal intensity between the low and mid frequencies, followed by a peak intensity and a gradual tapering off at a higher frequency. When the repetitive transient noise detector 102 identifies a repetitive transient noise, the repetitive transient noise detector 102 may look forward or backward in time to identify a second signal having substantially the same or similar characteristics.

Figure 4:
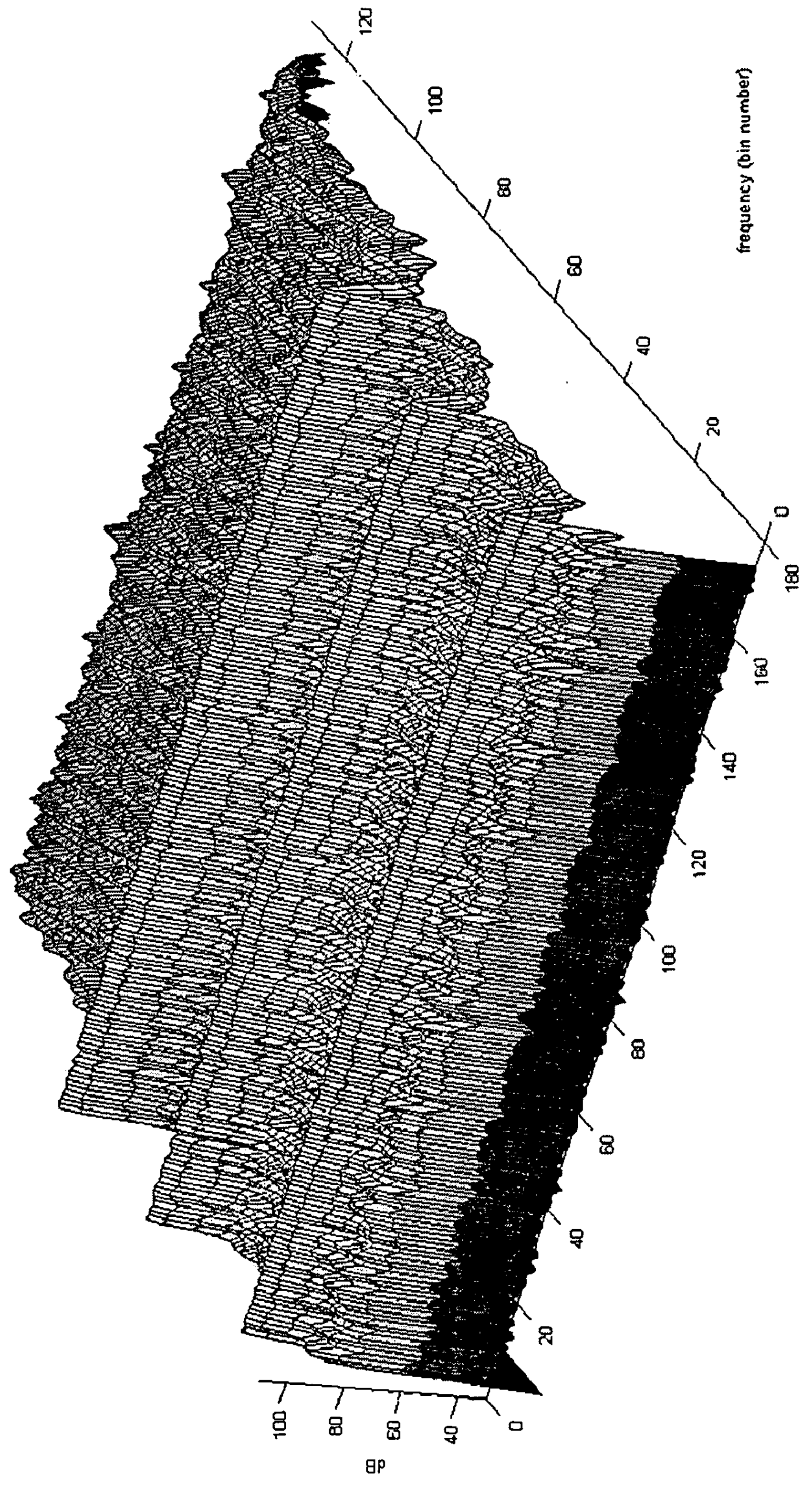
FIG. 4 is a partial plot of an illustrative voice signal.

FIG. 4 is a partial plot of an illustrative idealized voice signal. Multiple time intervals are arrayed along the horizontal time axis; frequency intervals are arrayed along the frequency axis; and signal magnitude is arrayed along the vertical axis. The idealized voiced signal (e.g., shown as an idealized pronunciation of a vowel) includes a combination of harmonic spectrum and background noise spectrum fairly stable in time. In this plot, the harmonic components are more prominent at the low frequencies, while the background noise component is more prominent at high frequencies. While shown across a small bandwidth, the harmonic and noise components may also appear across a large bandwidth (e.g., such as a broadband) and in the alternative have different characteristics. Some voice signals may have a high amplitude at lower frequencies that tapers off gradually at high frequencies.

Figure 5:
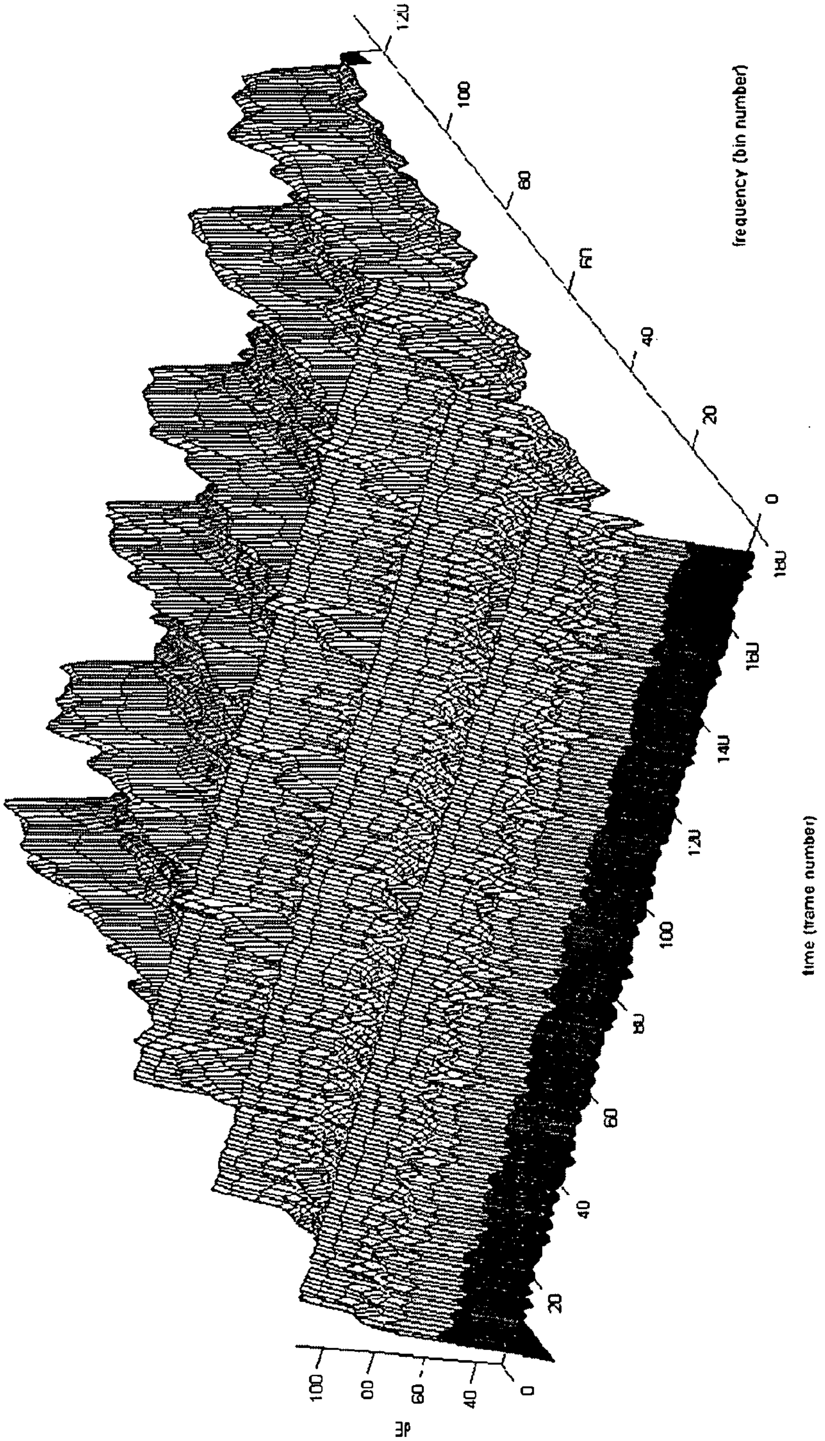
FIG. 5 is a partial plot of the voice signal of FIG. 4 in the presence of the repetitive transient noises of FIG. 2.

FIG. 5 is a partial plot of the voice signal of FIG. 4 in the presence of the repetitive transient noises of FIG. 2. In FIG. 5, the repetitive transient noise partially masks some of the spectral structure of the spoken vowel. Because of the periodicity or quasi-periodicity of the respective signals, the temporal and spectral shapes of the voice signal and repetitive transient noise may be identified.

When repetitive transient noises are identified, they may be substantially removed, attenuated, or dampened by the repetitive transient noise attenuator 104. Many methods may be used to substantially remove, attenuate, or dampen the repetitive transient noises. One method adds a repetitive transient noise model to an estimated or measured background noise signal. In the power spectrum, repetitive transient noise and continuous background noise measurements or estimates may be subtracted from a received signal. If a portion of the underlying speech signal is masked by a repetitive transient noise, a conventional or modified stepwise interpolator may reconstruct the missing portion of the signal. An inverse Fast Fourier Transform (FFT) may then convert the reconstructed signal to the time domain.

Figure 6:
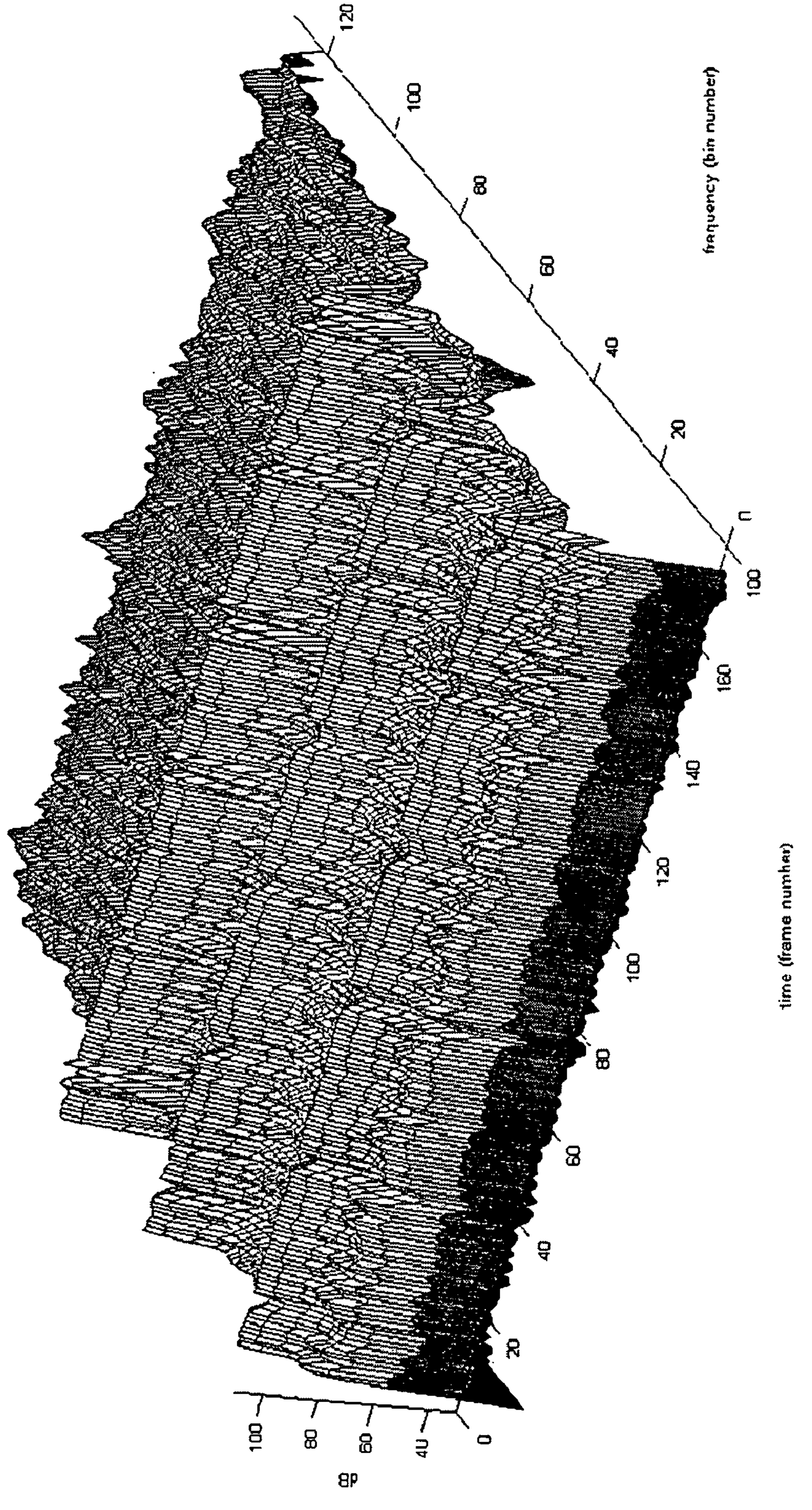
FIG. 6 is a plot of the voice signal of FIG. 5 with the repetitive transient noise of FIG. 2 substantially dampened.
Figure 7:
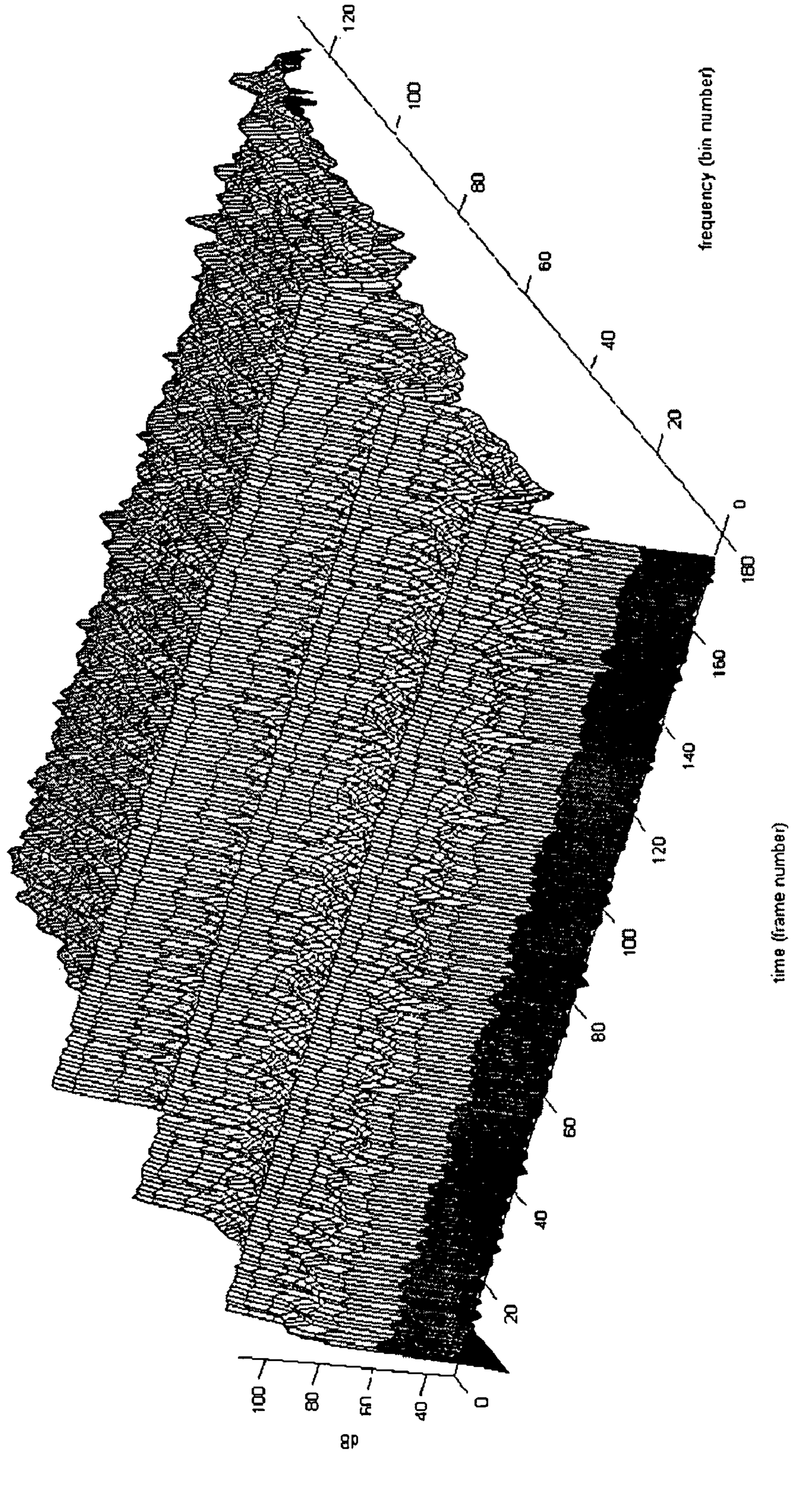
FIG. 7 is a partial plot of the voice signal of FIG. 6 with portions of the voice signal reconstructed.

FIG. 6 is a plot of the voice signal of FIG. 5 after the repetitive transient noise of FIG. 2 is dampened. While portions of the harmonic structure that was masked by the repetitive transient noise shown in FIG. 5 were attenuated, long-term correlation in the spectral structure and/or short term correlation in the spectral envelope of the voice signal may be used to reconstruct portions of the voice signal. In FIG. 7 portions of the voice signal were reconstructed through a linear step-wise interpolator. While the voice signal is substantially similar to the voice signal shown in FIG. 6, the attenuated voiced segments may also be replaced by a different signal with a different structure and similar spectral envelope so that the perceived quality of the reconstructed signal does not drop.

Figure 8:
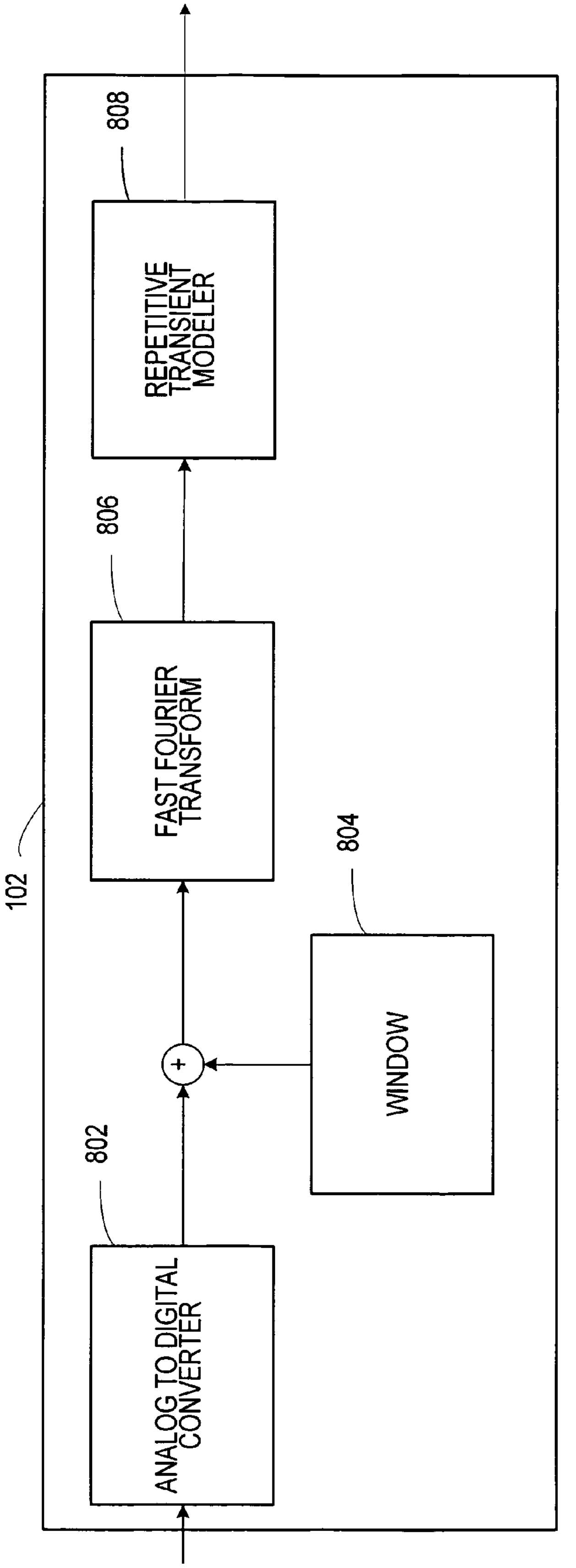
FIG. 8 is a representative repetitive transient noise detector.

FIG. 8 is a block diagram of a repetitive transient noise detector 102. The repetitive transient noise detector 102 receives or detects an input signal comprising speech, noise and/or a combination of speech and noise. The received or detected signal is digitized at a predetermined frequency. To assure a good quality voice, the voice signal is converted to a pulse-code-modulated (PCM) signal by an analog-to-digital converter 802 (ADC). A smoothing window function generator 804 generates a windowing function such as a Hanning window that is applied to blocks of data to obtain a windowed signal. The complex spectrum for the windowed signal may be obtained by means of an FFT 806 or other time-frequency transformation mechanism. The FFT separates the digitized signal into frequency bins, and calculates the amplitude of the various frequency components of the received signal for each frequency bin. The spectral components of the frequency bins may be monitored over time by a repetitive transient modeler 808.

There are multiple aspects to modeling repetitive transient noises in some voice enhancement systems. A first aspect may model one or many sound events that comprise the repetitive transient noise, and a second aspect may model the temporal space between the two sound events comprising a repetitive transient noise. A correlation between the spectral and/or temporal shape of a received signal and the modeled shape or between attributes of the received signal spectrum and the modeled attributes may identify a sound event as a repetitive transient noise. When a sound event is identified as a potential repetitive transient noise the repetitive transient noise modeler 808 may look back to previously analyzed time windows or forward to later received time windows, or forward and backward within the same time window, to determine whether a corresponding component of a repetitive transient noise was or will be received. If a corresponding sound event within an appropriate characteristic is received within an appropriate period of time, the sound event may be identified as a repetitive transient noise.

Alternatively or additionally, the repetitive transient noise modeler 808 may determine a probability that the signal includes repetitive transient noise, and may identify sound events as repetitive transient noise when a high correlation is found or when a probability exceeds a threshold. The correlation and probability thresholds may depend on varying factors, including the presence of other noises or speech within a received signal. When the repetitive transient noise detector 102 detects a repetitive transient noise, the characteristics of the detected repetitive transient noise may be sent to the repetitive transient noise attenuator 104 that may substantially remove or dampen the repetitive transient noise.

As more windows of sound are processed, the repetitive transient noise detector 102 may derive average noise models for repetitive transient noises and the temporal spacing between them. A time-smoothed or weighted average may be used to model repetitive transient noise events and the continuous noise sensed or estimated for each frequency bin. The average model may be updated when repetitive transient noises are detected in the absence of speech. Fully bounding a repetitive transient noise when updating the average model may increase accurate detections. A leaky integrator or a weighted average may model the interval between repetitive transient noise events.

To minimize the "music noise," squeaks, squawks, chirps, clicks, drips, pops, or other sound artifacts, an optional residual attenuator may condition the voice signal before it is converted to the time domain. The residual attenuator may be combined with the repetitive transient noise attenuator 104, combined with one or more other elements, or comprise a separate element.

A residual attenuator may track the power spectrum within a low frequency range (e.g., from about 0 Hz up to about 2 kHz). When a large increase in signal power is detected an improvement may be obtained by limiting or dampening the transmitted power in the low frequency range to a predetermined or calculated threshold. A calculated threshold may be substantially equal to, or based on, the average spectral power of that same low frequency range at an earlier period in time.

Figure 9:
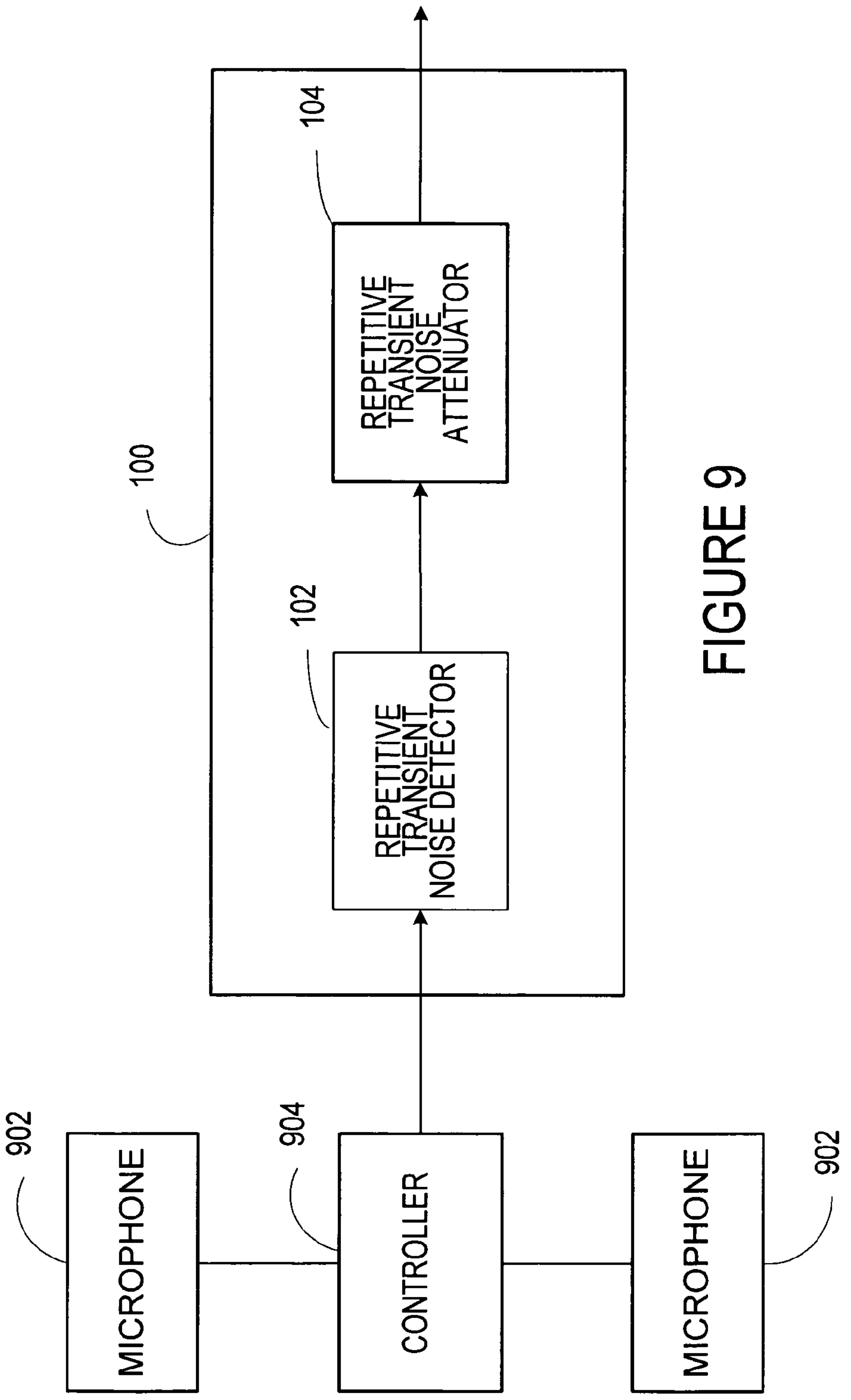
FIG. 9 is an alternate voice enhancement system.

Further changes in voice quality may be achieved by preconditioning the input signal before it is processed by the repetitive transient noise detector 102. One pre-processing system may exploit the lag time caused by a signal arriving at different times at different detectors that are positioned apart from on another as shown in FIG. 9. If multiple detectors or microphones 902 are used that convert sound into an electric signal, the pre-processing system may include a controller 904 that automatically selects the microphone 902 and channel that senses the least amount of noise. When another microphone 902 is selected, the signal may be combined with the previously generated signal before being processed by the repetitive transient noise detector 102.

Alternatively, repetitive transient noise detection may be performed on each of the channels coupled to the multiple detectors or microphones 902. A mixing of one or more channels may occur by switching between the outputs of the microphones 902. Alternatively or additionally, the controller 904 may include a comparator that detects the direction based on the differences in the amplitude of the signals or the time in which a signal is received from the microphones 902. Direction detection may be improved by positioning the microphones 902 in different directions.

Detected signals may be evaluated at frequencies above or below a predetermined threshold frequency through a high-pass or low pass filter, for example. The threshold frequency may be updated over time as the average repetitive transient noise model learns the frequencies of repetitive transient noises. When a vehicle is traveling at a higher speed, the threshold frequency for repetitive transient noise detection may be set relatively high, because the highest frequency of repetitive transient noises may increase with vehicle speed. Alternatively, controller 904 may combine the output signals of multiple microphones 902 at a specific frequency or frequency range through a weighting function.

Figure 10:
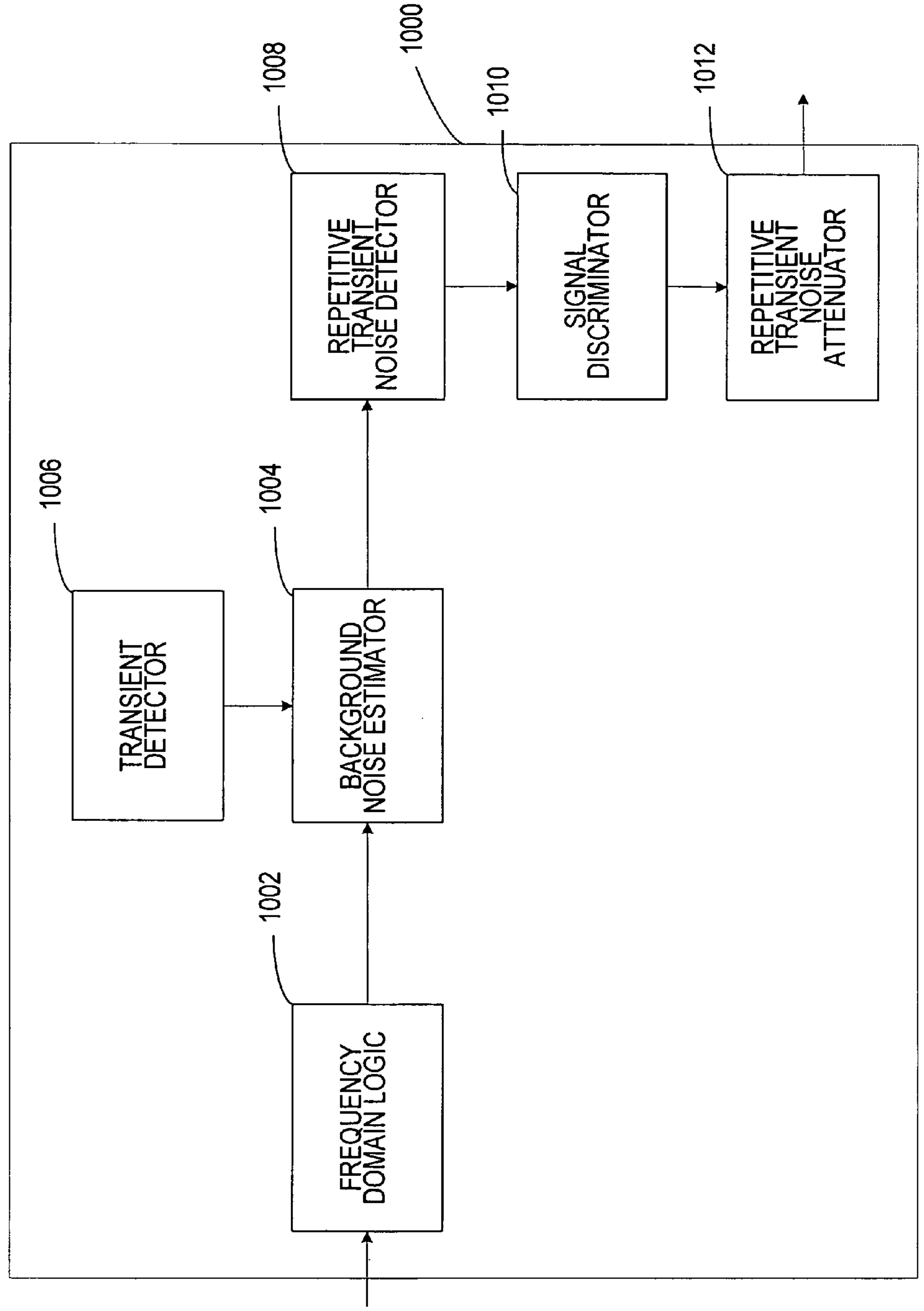
FIG. 10 is a second alternate voice enhancement system.

FIG. 10 is a second alternate voice enhancement system 1000. Time-frequency transform logic 1002 digitizes and converts a time varying signal to the frequency domain. A background noise estimator 1004 measures continuous, ambient, and/or background noise that occurs near a sound source or the receiver. The background noise estimator 1004 may comprise a power detector that averages the acoustic power in each frequency bin in the power, magnitude, or logarithmic domain. To prevent biased background noise estimations at or near transients, a transient detector 1006 may disable or modulate the background noise estimation process during abnormal or unpredictable increases in power. In FIG. 10, the transient detector 1006 disables the background noise estimator 1004 when an instantaneous background noise B(f, i) exceeds an average background noise B(f)Ave by more than a selected decibel level 'c.' This relationship may be expressed as:

$$B(f,i)>B(f)Ave+c \qquad \text{Equation 1}$$

Alternatively or additionally, the average background noise may be updated depending on the signal to noise ratio (SNR). An example closed algorithm is one which adapts a leaky integrator depending on the SNR:

$$B(f)Ave'=aB(f)Ave+(1-a)S \qquad \text{Equation 2}$$

where a is a function of the SNR and S is the instantaneous signal. In this example, the higher the SNR, the slower the average background noise is adapted.

To detect a sound event that may correspond to a repetitive transient noise, the repetitive transient noise detector 1008 may fit a function to a selected portion of the signal in the time-frequency domain. A correlation between a function and the signal envelope in the time domain over one or more frequency bands may identify a sound event corresponding to a repetitive transient noise event. The correlation threshold at which a portion of the signal is identified as a sound event potentially corresponding to a repetitive transient noise may depend on a desired clarity of a processed voice and the variations in width and sharpness of the repetitive transient noise. Alternatively or additionally, the system may determine a probability that the signal includes a repetitive transient noise, and may identify a repetitive transient noise when that probability exceeds a probability threshold. The correlation and probability thresholds may depend on various factors, including the presence of other noises or speech in the input signal. When the noise detector 1008 detects a repetitive transient noise, the characteristics of the detected repetitive transient noise may be provided to the repetitive transient noise attenuator 1012 through the optional signal discriminator 1010 for substantially removing or dampening the repetitive transient noise.

A signal discriminator 1010 may mark the voice and noise of the spectrum in real, near real or delayed time. Any method may be used to distinguish voice from noise. Spoken signals may be identified by one or more of the following attributes: the narrow widths of their bands or peaks; the broad resonances, which are known as formants and are created by the vocal tract shape of the person speaking; the rate at which certain characteristics change with time (e.g., a time-frequency model may be developed to identify spoken signals based on how they change with time); and when multiple detectors or microphones are used, the correlation, differences, or similarities of the output signals of the detectors or microphones.

Figure 11:
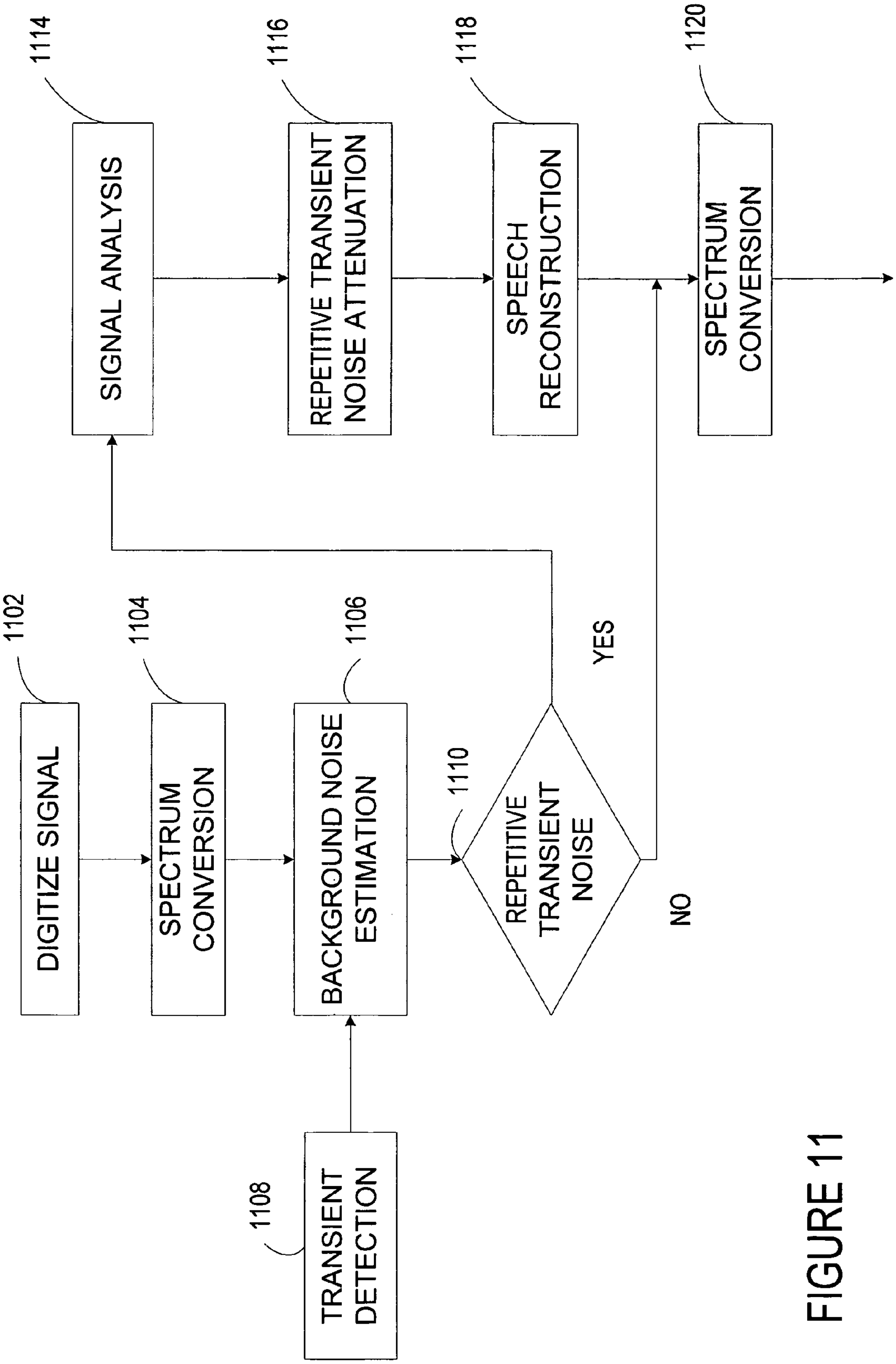
FIG. 11 is a process that removes repetitive transient noises from a voice or an aural signal.

FIG. 11 is a process that removes repetitive transient noises from a voice signal. At 1102 a received or detected signal is digitized at a predetermined frequency. To assure a good quality voice, the voice signal may be converted to a PCM signal by an ADC. At 1104 a complex spectrum for the windowed signal may be obtained by means of an FFT that separates the digitized signals into frequency bins, with each bin identifying an amplitude and phase across a small or limited frequency range.

At 1106, a continuous, ambient, and/or background noise estimate occurs. The background noise estimate may comprise an average of the acoustic power in each frequency bin. To prevent biased noise estimates at transients, the noise estimate process may be disabled during abnormal or unpredictable increases in power. The transient detection 1108 disables the background noise estimate when an instantaneous background noise exceeds an average background noise by more than a predetermined decibel level. At 1110 a repetitive transient noise may be detected when sound events consistent with a repetitive transient noise model are detected. The sound events may be identified by characteristics of their spectral shape or other attributes.

The detection of repetitive transient noises may be constrained in varying ways. For example, if a vowel or another harmonic structure is detected, the transient noise detection method may limit the transient noise correction to values less than or equal to average values. An alternate or additional method may allow the average repetitive transient noise model or attributes of the repetitive transient noise model, such as the spectral shape of the modeled sound events or the temporal spacing of the repetitive transient noises to be updated only during unvoiced speech segments. If a speech or speech mixed with noise segment is detected, the average repetitive transient noise model or attributes of the repetitive transient noise model may not be updated. If no speech is detected, the repetitive transient noise model may be updated through varying methods, such as through a weighted average or a leaky integrator.

If a repetitive transient noise is detected at 1110, a signal analysis may be performed at 1114 to discriminate or mark the spoken signal from the noise-like segments. Spoken signals may be identified by the narrow widths of their bands or peaks; the broad resonances, which are also known as formants and are created by the vocal tract shape of the person speaking; the rate at which certain characteristics change with time (e.g., a time-frequency model may be developed to identify spoken signals based on how they change with time); and when multiple detectors or microphones are used, the correlation, differences, or similarities of the output signals of the detectors or microphones.

To overcome the effects of repetitive transient noises, a repetitive noise is substantially removed or dampened from the noisy spectrum at 1116. One method adds a repetitive transient noise model to a monitored or modeled continuous noise. In the power spectrum, the modeled noise may then be substantially removed from the unmodified spectrum. If an underlying speech signal is masked by a repetitive transient noise, or masked by a continuous noise, a conventional or modified interpolation method may be used to reconstruct the speech signal at 1118. A time series synthesis may then be used to convert the signal power to the time domain at 1120. The result is a reconstructed speech signal from which the repetitive transient noise has been substantially removed or dampened. If no repetitive transient noise is detected at 1110, the signal may be converted directly into the time domain at 1120.

The method of FIG. 11 may be encoded in a signal bearing medium, a computer readable medium such as a memory, programmed within a device such as one or more integrated circuits, or processed by a controller or a computer. If the methods are performed by software, the software may reside in a memory resident to or interfaced to the repetitive transient noise detector 102, a communication interface, or any other type of non-volatile or volatile memory interfaced or resident to the voice enhancement system 100 or 1000. The memory may include an ordered listing of executable instructions for implementing logical functions. A logical function may be implemented through digital circuitry, through source code, through analog circuitry, through an analog source such as an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The above-described systems may condition signals received from only one or more than one microphone or detector. Many combinations of systems may be used to identify and track repetitive transient noises. Besides the fitting of a function to a sound suspected of being part of a repetitive transient noise, a system may detect and isolate any parts of a signal having energy greater than the modeled events. One or more of the systems described above may also interface or may be a unitary part of alternative voice enhancement logic.

Other alternative voice enhancement systems comprise combinations of the structure and functions described above. These voice enhancement systems are formed from any combination of structure and function described above or illustrated within the figures. The system may be implemented in software or hardware. The hardware may include a processor or a controller having volatile and/or non-volatile memory and may also comprise interfaces to peripheral devices through wireless and/or hardwire mediums.

Figure 12:
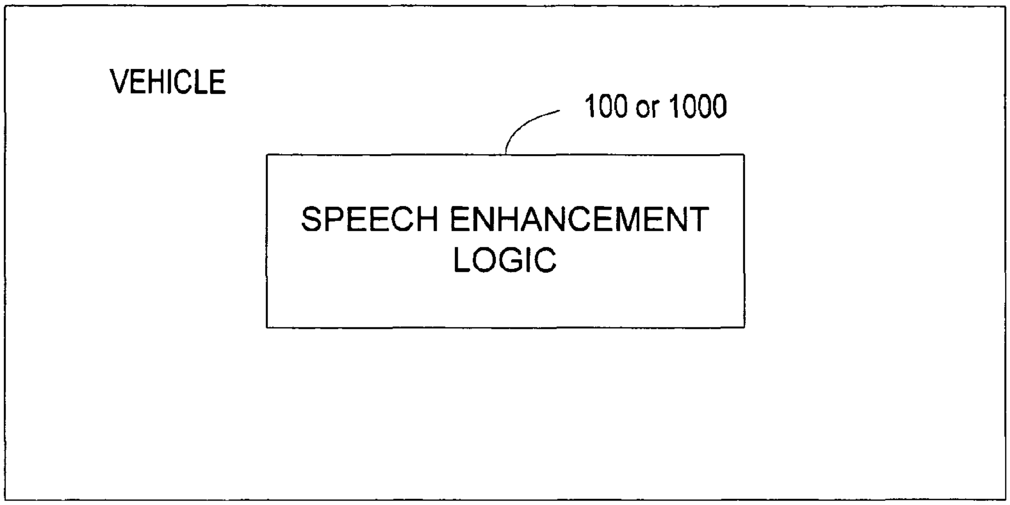
FIG. 12 is a block diagram of a voice enhancement system within a vehicle.
Figure 13:
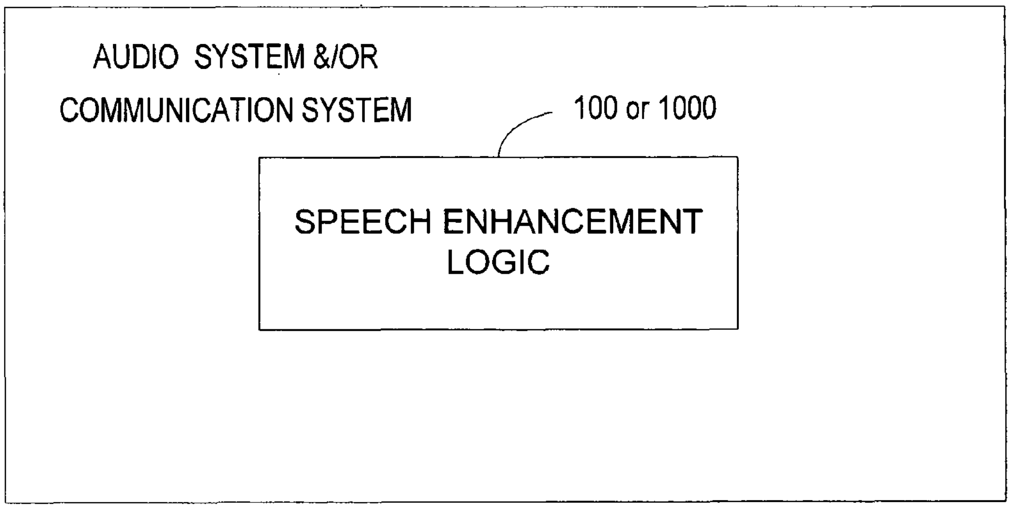
FIG. 13 is a block diagram of a voice enhancement system interfaced to an audio system and/or a navigation system and/or a communication system.

The voice enhancement system is easily adaptable to any technology or devices. Some voice enhancement systems or components interface or couple vehicles as shown in FIG. 12, instruments that convert voice and other sounds into a form that may be transmitted to remote locations, such as landline and wireless phones and audio systems as shown in FIG. 13, video systems, personal noise reduction systems, and other mobile or fixed systems that may be susceptible to transient noises. The communication systems may include portable analog or digital audio and/or video players (e.g., such as an iPod®), or multimedia systems that include or interface voice enhancement systems or retain voice enhancement logic or software on a hard drive, such as a pocket-sized ultra-light hard-drive, a memory such as a flash memory, or a storage media that stores and retrieves data. The voice enhancement systems may interface or may be integrated into wearable articles or accessories, such as eyewear (e.g., glasses, goggles, etc.) that may include wire free connectivity for wireless communication and music listening (e.g., Bluetooth stereo or aural technology) jackets, hats, or other clothing that enables or facilitates hands-free listening or hands-free communication.

The voice enhancement system improves the perceptual quality of a processed voice. The software and/or hardware logic may automatically learn and encode the shape and form of the noise associated with repetitive transient noise in real time, near real time or after a delay. By tracking selected attributes, the system may eliminate, substantially eliminate, or dampen repetitive transient noise using a limited memory that temporarily or permanently stores selected attributes of the repetitive transient noise. Some voice enhancement system may also dampen a continuous noise and/or the squeaks, squawks, chirps, clicks, drips, pops, tones, or other sound artifacts that may be generated within some voice enhancement systems and may reconstruct voice when needed.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for suppressing repetitive transient noises from a signal comprising:

a repetitive transient noise detector that comprises a processor adapted to detect the presence of transient noise in a received signal comprising a harmonic spectrum and a noise spectrum, where the repetitive transient noise detector is adapted to analyze one or more frequency spectrum sound event characteristics and one or more temporal sound event characteristics of the transient noise to determine whether the transient noise is repetitive transient noise; and a repetitive transient noise attenuator adapted to dampen the transient noise detected in the received signal in response to the repetitive transient noise detector identifying the transient noise as being repetitive transient noise;

where the repetitive transient noise detector is adapted to fit a function to a selected portion of the received signal in a time-frequency domain to evaluate spectro-temporal shape characteristics of a sound event in the received signal and to determine whether the transient noise is repetitive transient noise; and where the repetitive transient noise detector is adapted to identify the sound event as a repetitive transient noise event based on the function, a signal envelope of the sound event, and a correlation threshold that depends on a width and sharpness of the repetitive transient noise.

2. The system of claim 1 where the repetitive transient noise detector comprises a model of repetitive transient noise and the repetitive transient noise detector is adapted to compare an attribute of the received signal with an attribute of the model of the repetitive transient noise.

3. The system of claim 2 where the model of the repetitive transient noise comprises an average repetitive transient noise model based on multiple repetitive transient noise models.

4. The system of claim 2 where the model comprises a spectral component and a temporal component, and where the temporal component comprises a first sound event and a second substantially similar sound event separated in time.

5. The system of claim 4 where a period of time between the first sound event and the second sound event is estimated through an adaptive model.

6. The system of claim 2 where the model comprises a spectral component and a temporal component, and where the spectral component comprises one or more attributes of a spectral shape of a sound event associated with a repetitive transient noise.

7. The system of claim 6 where the attributes of the spectral shape of a sound event associated with a repetitive transient noise comprises a broadband frequency response.

8. The system of claim 7 further comprising a vehicle that transports the repetitive transient noise detector and the repetitive transient noise attenuator.

9. The system of claim 1 where the repetitive transient noise detector is adapted to estimate or measure a temporal spacing between multiple sound events of the transient noise and compare the temporal spacing to a modeled temporal spacing of a model repetitive transient noise to identify whether the transient noise is repetitive.

10. The system of claim 1 where the repetitive transient noise detector is adapted to identify a first sound event in the received signal as being a potential repetitive transient noise, where the repetitive transient noise detector is adapted to analyze one or more portions of the received signal before or after the first sound event to determine whether the received signal contains a second sound event with the same or similar characteristics as the first sound event, and where the repetitive transient noise detector is adapted to determine that the received signal comprises repetitive transient noise upon locating the second sound event.

11. The system of claim 1 further comprising a background noise estimator and a transient detector, where the transient detector disables the background noise estimator in response to a determination that an instantaneous background noise level exceeds an average background noise level by more than a pre-determined amount.

12. The system of claim 1 where in response to identifying a first sound event as a potential repetitive transient noise, the repetitive transient noise detector looks back to previously analyzed time windows to determine whether a corresponding sound event of a repetitive transient noise was received, and where the repetitive transient noise detector identifies the first sound as a repetitive transient noise in response to locating the corresponding sound event.

13. The system of claim 1 where in response to identifying a first sound event as a potential repetitive transient noise, the repetitive transient noise detector looks forward to later received time windows to determine whether a corresponding sound event of a repetitive transient noise will be received, and where the repetitive transient noise detector identifies the first sound as a repetitive transient noise in response to locating the corresponding sound event.

14. The system of claim 1 where the repetitive transient noise detector is adapted to determine a probability that the received signal includes repetitive transient noise, and identify a sound event as repetitive transient noise when the probability exceeds a predetermined threshold.

15. A repetitive transient noise detector for detecting the presence of repetitive noise in a signal, the repetitive transient noise detector comprising:

an analog to digital converter for converting a received signal into a digital signal;

a windowing function generator for dividing the received signal into a plurality of individual analysis windows;

a transform module for transforming the individual analysis windows from a time domain spectra to a frequency domain spectra;

a modeler that generates and stores attributes of repetitive transient noise in a memory; and a controller adapted to fit a function to a selected portion of the received signal in a time-frequency domain to evaluate spectro-temporal shape characteristics of a transient noise in the received signal and to determine whether the transient noise is repetitive transient noise, where the controller is adapted to identify the transient noise as a repetitive transient noise event based on the function, a signal envelope of the sound event, and a correlation threshold that depends on a width and sharpness of the repetitive transient noise;

where the modeler is adapted to identify the transient noise for attenuation in response to the modeler determining that the transient noise is repetitive transient noise.

16. The repetitive transient noise detector of claim 15 where the model attributes comprise average model attributes based on attributes of multiple models.

17. The repetitive transient noise detector of claim 15 where the windowing function generator comprises a Hanning window function generator.

18. The repetitive transient noise detector of claim 15 where the transform module performs a Fast Fourier Transform on the plurality of individual analysis windows.

19. The repetitive transient noise detector of claim 15 where the model attributes comprise temporal characteristics of repetitive transient noises.

20. The repetitive transient noise detector of claim 19 where the model attributes comprise spectral characteristics of repetitive transient noises.

21. The repetitive transient noise detector of claim 15 where the model attributes comprise temporal characteristics and spectral characteristics of estimated repetitive transient noises.

22. The repetitive transient noise detector of claim 21 where the model attributes represent a plurality of sound events having substantially similar spectral characteristics separated by a short time period.

23. The repetitive transient noise detector of claim 22 where the model attributes comprise spectral shape characteristics of the plurality of sound events.

24. The repetitive transient noise detector of claim 15 further comprising a residual attenuator for tracking the power spectrum of the received signal.

25. The repetitive transient noise detector of claim 15 where the controller is adapted to analyze attributes of the spectra of the transformed analysis windows to determine whether the transient noise is repetitive transient noise.

26. The repetitive transient noise detector of claim 15 where the controller is adapted to estimate or measure a temporal spacing between multiple sound events of the transient noise and compare the temporal spacing to a modeled temporal spacing of a model repetitive transient noise to identify whether the transient noise is repetitive.

27. The repetitive transient noise detector of claim 15 where the modeler comprises a non-transitory computer-readable medium or circuit.

28. A method of attenuating repetitive transient noises from a signal comprising:

fitting a function to a received signal in a time-frequency domain to evaluate spectro-temporal shape characteristics of a transient noise in the received signal and to determine whether the transient noise is repetitive transient noise;

identifying the transient noise as a repetitive transient noise event based on the function, a signal envelope of the transient noise, and a correlation threshold that depends on a width and sharpness of the repetitive transient noise; and attenuating, by a processor, at least a portion of the transient noise from the received signal in response to identifying the transient noise as the repetitive transient noise event.

29. The method of claim 28 further comprising:

deriving an average repetitive transient noise model from multiple modeled characteristics of repetitive transient noises;

determining whether the characteristics of the signal correspond to characteristics of the average repetitive transient noise model.

30. The method of claim 28 further comprising:

identifying a first sound event in the signal as being a potential repetitive transient noise;

analyzing one or more portions of the signal before or after the first sound event to determine whether the signal contains a second sound event with the same or similar characteristics as the first sound event; and determining that the signal comprises repetitive transient noise upon locating the second sound event.

31. The method of claim 28 further comprising modeling spectral shape attributes of repetitive transient noises.

32. The method of claim 31 where the spectral shape attributes of the sound events occur across a broadband frequency.

33. A system for suppressing repetitive transient noises from a signal comprising:

a repetitive transient noise detector that comprises a processor adapted to fit a function to a received signal in a time-frequency domain to evaluate spectro-temporal shape characteristics of a transient noise in the received signal and to determine whether the transient noise is repetitive transient noise; and a repetitive transient noise attenuator adapted to dampen the transient noise in the received signal in response to the repetitive transient noise detector identifying the transient noise as being repetitive;

where the repetitive transient noise detector is adapted to identify the transient noise as a repetitive transient noise event based on the function, a signal envelope of the transient noise, and a correlation threshold that depends on a width and sharpness of the repetitive transient noise.

34. A system for suppressing repetitive transient noises from a signal comprising:

a repetitive transient noise detector that comprises a processor adapted to detect the presence of transient noise in a received signal comprising a harmonic spectrum and a noise spectrum, where the repetitive transient noise detector is adapted to fit a function to a selected portion of the received signal in a time-frequency domain to evaluate spectro-temporal shape characteristics of a sound event in the received signal and to determine whether the transient noise is repetitive transient noise, where the repetitive transient noise detector is adapted to identify the sound event as a repetitive transient noise event based on a correlation between the function and a signal envelope of the sound event; and a repetitive transient noise attenuator adapted to dampen the transient noise detected in the received signal in response to the repetitive transient noise detector identifying the transient noise as being repetitive transient noise;

where the repetitive transient noise detector is adapted to identify the sound event as the repetitive transient noise event based on the function, the signal envelope of the sound event, and a correlation threshold that depends on a width and sharpness of the repetitive transient noise.

* * * * *